United States Patent [19]

Nuber

[11] 3,779,583

[45] Dec. 18, 1973

[54] LINE CUTTING INSULATOR

[76] Inventor: Frederick H. Nuber, 66 Clearmont Ave., Denville, N.J. 07834

[22] Filed: Apr. 13, 1972

[21] Appl. No.: 243,730

[52] U.S. Cl............... 285/48, 29/455, 29/463, 285/3, 285/373
[51] Int. Cl............................................. F16l 59/16
[58] Field of Search........................ 137/317, 318; 251/146; 285/3, 48, 49, 53, 121, 364, 369, 373; 29/455, 463

[56] References Cited
UNITED STATES PATENTS

| 2,752,579 | 6/1956 | Caldwell et al. | 285/48 X |
| 3,566,510 | 3/1971 | Wendt | 285/49 X |
| 3,650,547 | 3/1972 | Tickett | 285/3 |
| 3,652,107 | 3/1972 | Tickett | 285/3 |

FOREIGN PATENTS OR APPLICATIONS

| 885,032 | 6/1953 | Germany | 285/48 |

Primary Examiner—Mervin Stein
Assistant Examiner—David H. Corbin
Attorney—Lawrence I. Lerner et al.

[57] ABSTRACT

An assembly and method are disclosed for insulating sections of a pipeline with the assembly including a first section surrounding the pipeline, the first section terminating in an enlarged flange at one end thereof, with the first section further including closeable access means for permitting access to the pipeline; a second section surrounding the pipeline, the second section terminating in an enlarged flange at one end thereof, with the enlarged flanges of the first and second sections being positioned in confronting relationship to one another; an insulating sleeve, positioned about the pipeline between the pipeline and the first and second sections; insulating spacer means positioned about the pipeline and disposed between the flanges of the first and second sections; and insulating joining means for drawing the flanges of the first and second sections toward one another. In this manner, after the assembly is positioned on the pipeline, the pipeline can be severed through the access means in the aforementioned first section.

14 Claims, 3 Drawing Figures

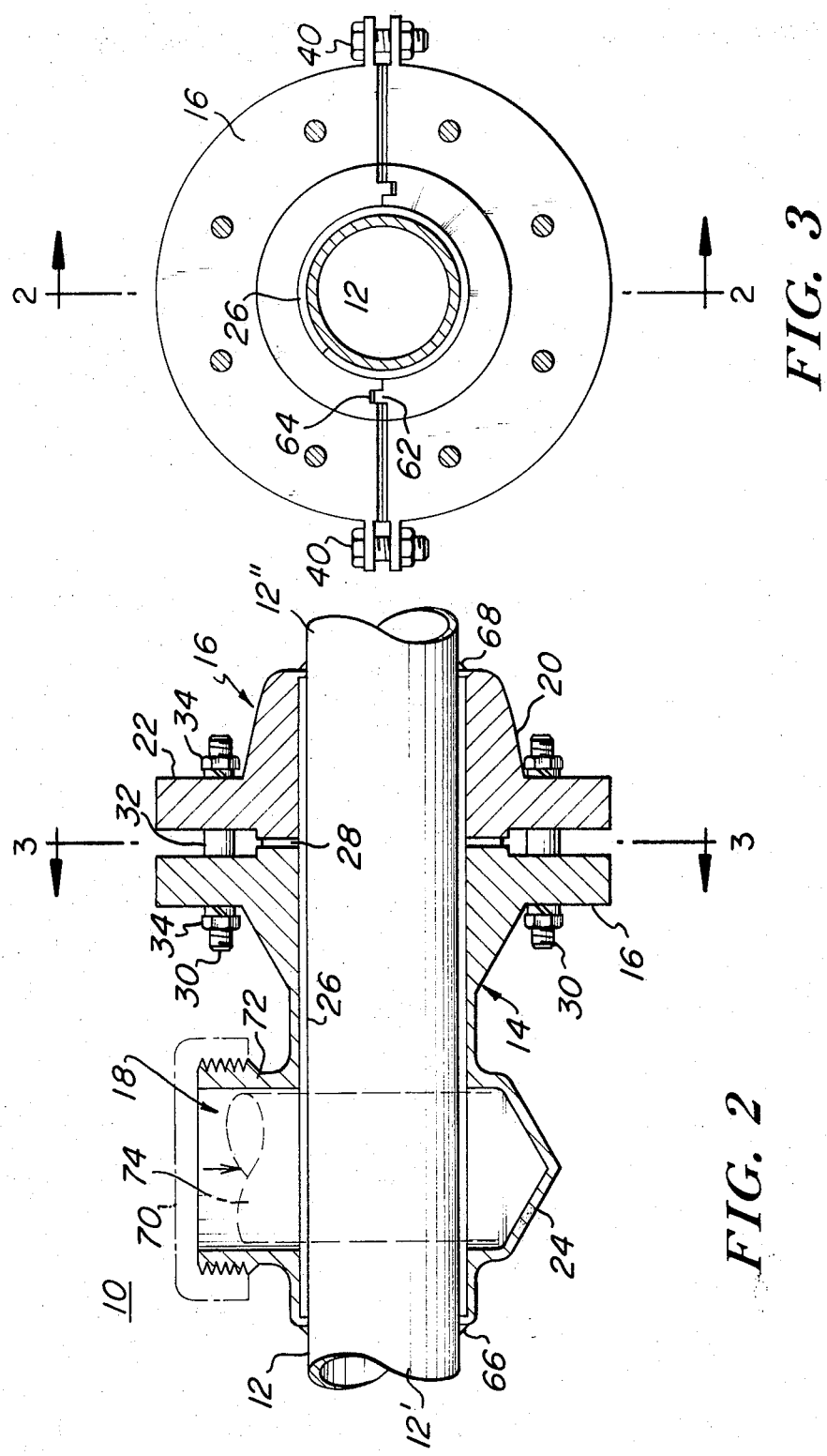

LINE CUTTING INSULATOR

FIELD OF THE INVENTION

This invention relates to an assembly and method for insulating sections of a pipeline and more particularly, to such an assembly and method which rapidly permits a continuous pipeline to be sectionalized in situ.

BACKGROUND OF THE INVENTION

A serious problem encountered with continuous pipelines for example, gas pipelines, relates to the flow of small electrical currents in the pipeline which result from differences in potential therealong. In fact, for proper electrolysis control, it is the present practice to establish a lengthy pipeline by joining a plurality of sections insulatingly joined to one another.

In situations where an existing continuous length of pipeline is to be converted to a plurality of insulated sections, it is the current practice to employ a pair of line-stoppers on opposite sides of the location where a cut in the pipe is to be performed, and then establish a temporary by-pass flow conduit from line-stopper to line-stopper while the cut is being made. Once the cut is completed, an insulated flanged coupling is secured thereabout, and finally the by-pass flow conduit is removed, and the gas permitted to flow once again through the main pipeline. This procedure, which necessitates the temporary by-pass flow conduit, is cumbersome, expensive and extremely time consuming, requiring many man hours of labor to effectuate.

SUMMARY OF THE INVENTION

In contra-distinction to the present practice for insulating sections of a pipeline, the instant invention provides an assembly and method which totally eliminates the necessity of temporarily diverting the flow from the pipeline which is to be severed. More specifically, the assembly of the instant invention includes first and second coupling sections which are placed about the pipeline with an insulating spacer therebetween and an insulating sleeve between the sections and the pipeline itself. Each of the coupling sections includes an enlarged flange portion which are drawn toward one another by insulating joining means, such as insulated bolts, while one of the coupling sections further includes an access opening for access to the pipeline. After the assembly is properly positioned on the pipeline and sealed thereto, for example by welding, the pipeline is completely severed through the aforementioned access opening. In this connection, the aforementioned section which includes the access opening also includes a depending well oppositely disposed from the access opening to facilitate the severing operation and to accumulate the scrap pieces of the pipeline which result from the severing operation. After the severing has been effected, the access opening is reclosed. It will thus be appreciated that the entire operation of severing and thereby insulating sections of the pipeline has been effectuated in situ and without the necessity of establishing a temporary by-pass flow conduit for the contents of the pipeline.

As a particularly advantageous feature of the instant invention, each of the aforementioned first and second coupling sections preferably takes the form of first and second half sections which are placed about the pipeline and then secured to one another. In the same vein, the aforementioned insulating sleeve and insulating spacer are of split construction, such that they may be positioned on a continuous length of pipeline. Finally, the confronting portions of the flanges of the aforementioned half sections of the first and second coupling sections are provided with cooperating tongue and groove arrangements to facilitate alignment and help prevent gas leakage.

BRIEF DESCRIPTION OF THE SEVERAL VIEWS OF THE DRAWINGS

FIG. 2 is a sectional view of the assembly of the instant invention, taken along the lines 2—2 of FIG. 3; and FIG. 3 is a view of the assembly of FIG. 2 taken along the lines of 3—3 thereof.

DESCRIPTION OF THE PREFERRED EMBODIMENT

Figure 1:
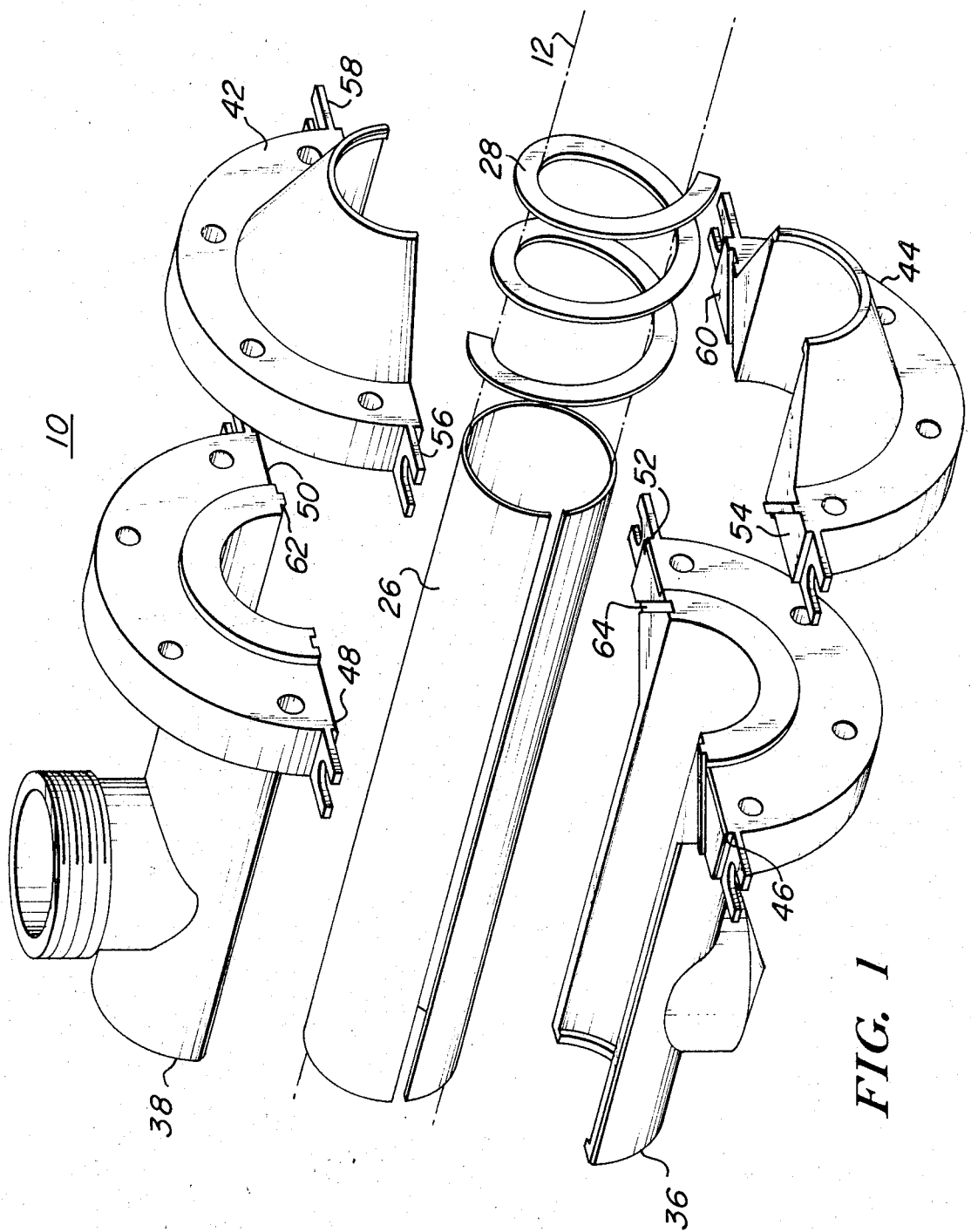
FIG. 1 is a exploded perspective view of the assembly of the instant invention.

Turning to the figures, there is shown an assembly 10 for insulating sections of what initially is a continuous pipeline 12, for example, a gas pipeline.

With reference to FIG. 2, the assembly includes first and second coupling sections 14 and 16, respectively. Coupling section 14 terminates at one end thereof in an enlarged flange portion 16 and at the opposite end thereof is provided with closeable access means, broadly designated 18, for permitting access to the pipeline 12. The first coupling section 14 also includes a depending well 24, the purpose of which will be further explained, positioned diametrically opposite from the access means 18. The second coupling section 16 includes a generally frustroconical portion 20 and an enlarged flange portion 22 positioned in confronting relationship with respect to the flanged portion 16 of the first section 14.

A split insulating sleeve 26 surrounds the pipeline 12 and a split spiral insulating ring 28 is positioned between the confronting flange portions 16 and 22. Bolts 30 surrounded by insulating sleeves 32 insulatingly joins the flange portions 16 and 22, with the aid of drawing nuts 34.

With reference to FIG. 1, it will be seen that the first coupling section 14 actually comprises first and second half sections 36 and 38 which are joined to one another by nuts and bolts generally indicated at 40 in FIG. 3. In like fashion, the second coupling section 16 of FIG. 2, actually comprises first and second half sections 42 and 44 joined to one another by nut and bolt arrangements similar to those designated at 40 in FIG. 3. Moreover, and with reference to FIGS. 1 and 3, it will be seen that the confronting faces 46, 48; 50, 52; 54,56; 58 and 60 of the respective flanged portions of the respective half sec tions 36, 38, 42 and 44 are provided with mating tongue and groove arrangements, for example, illustrated at 62, 64 which facilitate alignment when the respective half sections are secured to one another.

In employing the arrangement of the instant invention, the split sleeve 26 is temporarily opened and placed over the pipeline 12. The two section halves 36 and 38 of the first section 14 and the two section halves 42, 44 of the second section 16 are then placed over the sleeve 26 with the spiral split insulating ring 28 disposed therebetween. Nuts and bolts 40 join the section halves to one another, and the insulated bolt arrangements 30, 32 and 34 are employed to draw the sections 14 and 16 into tight engagement with one another, with the spiral ring 28 therebetween. To insure a tight sealing arrangement, the respective half sections 36 and 38 and 42 and 44 are welded together along their mating peripheries and the respective sections 14 and 16 are also welded to the pipeline 12 as indicated, for example, at 66 and 68 in FIG. 2.

Thereafter, the cap illustrated at 70 in FIG. 2 is removed and a conventional sealed cutting instrument is secured on the upstanding cylindrical externally threaded portion 72, comprising a portion of the access means 18. The cutting instrument conventionally includes a circular cutting tool suggested at 74, which is brought down through the pipeline 12. The cutting tool 74 has a greater diameter than the diameter of the pipeline 12, thereby completely severing same. The depending well 24 permits the circular cutting tool 74 to exit completely through the pipeline 12 and also accumulates any shavings which result from the cutting operation. After the severance is completed, and as well known in the art, the drilling instrument may be removed and the cap 70 replaced without the loss of any of the gas flowing through the pipeline 12.

Once the above has been effectuated, the pipeline section 12' is electrically insulated from the section 12'' by virtue of the opening established by the cutting instrument 74. This may be understood by appreciating that current could flow along the pipeline section 12' and through the first coupling section 14, but would be interrupted by the insulated bolt arrangement 30, 32 34, the spiral insulator 28 and the sleeve 26. It will be appreciated that the entire sectionalizing operation has been effectuated without any interruption of the flow of gas to the main pipeline 12.

While this invention has been described with respect to a particular embodiment thereof, numerous others will become obvious to those of ordinary skill in the art in light thereof.

I claim

1. An assembly for insulating sections of a pipeline; said assembly comprising
   a first coupling section surrounding said pipeline, said first section terminating in an enlarged flange at one end thereof, said first section further including closeable access means for permitting access to said pipeline;
   a second coupling section surrounding said pipeline, said second section terminating in an enlarged flange at one end thereof, said enlarged flange of said first and second sections being positioned in confronting relationship to one another; means for fixedly and sealingly securing said first and second sections to said pipeline;
   insulating sleeve means positioned about said pipeline between said pipeline and said first and second sections;
   insulating spacer means positioned about said pipeline and between said flanges of said first and second sections; and
   insulating joining means for joining said flanges of said first and second sections.

2. The assembly of claim 1 wherein said insulating sleeve means is an elongated split sleeve.

3. The assembly of claim 2 wherein said insulating spacer means is a spiral split ring.

4. The assembly of claim 1 wherein said insulating spacer means is a spiral split ring.

5. The assembly of claim 3 wherein said first section includes accumulation means disposed opposite said closeable opening means.

6. The assembly of claim 1 wherein said first section includes accumulation means disposed opposite said closeable opening means.

7. The assembly of claim 6 wherein said accumulation means comprises a depending well.

8. The assembly of claim 7 wherein said closeable access means comprises an upstanding cylindrical segment surrounding an opening in said first section.

9. The assembly of claim 6 wherein said first section comprises first and second half sections removably joined to one another; and said second section comprises first and second half sections removably joined to one another.

10. The assembly of claim 1 wherein said first section comprises first and second half sections removably joined to one another; and said second section comprises first and second half sections removably joined to one another.

11. The assembly of claim 10 wherein said insulating sleeve means is an elongated split sleeve and wherein said insulating spacer means is a spiral split ring.

12. The assembly of claim 10 wherein the confronting faces of the flanges of the first and second half sections of the first and second sections are provided with cooperating tongue and groove mating arrangements.

13. The assembly of claim 1 wherein said closeable access means includes an opening having a diameter greater than the diameter of said pipeline.

14. The assembly of claim 13 wherein said first section includes accumulation means disposed opposite said closeable opening means and wherein said accumulation means comprises a depending well and wherein said well has a diameter greater than the diameter of said pipeline.

* * * * *